US005814683A

United States Patent [19]

Branham

[11] Patent Number: 5,814,683

[45] Date of Patent: Sep. 29, 1998

[54] POLYMERIC ADDITIVES FOR THE ELIMINATION OF INK JET AEROSOL GENERATION

[75] Inventor: Bradley B. Branham, Portland, Oreg.

[73] Assignee: Hewlett-Packard Company, Palo Alto, Calif.

[21] Appl. No.: 567,973

[22] Filed: Dec. 6, 1995

[51] Int. Cl.[6] .................... C09D 11/10

[52] U.S. Cl. .................... 523/161; 524/516; 524/555; 523/160; 260/DIG. 38; 106/31.13

[58] Field of Search .................... 523/161, 160; 260/DIG. 38; 106/20 D, 20 R, 31.13; 524/555, 516

[56] References Cited

U.S. PATENT DOCUMENTS

| | | | |
|---|---|---|---|
| 4,260,531 | 4/1981 | Wachtel et al. | 524/389 |
| 4,425,469 | 1/1984 | Emmons et al. | 524/750 |
| 4,791,165 | 12/1988 | Bearss et al. | 524/516 |
| 5,198,023 | 3/1993 | Stoffel | 106/22 R |

FOREIGN PATENT DOCUMENTS

| | | | |
|---|---|---|---|
| 0525994A1 | 2/1993 | European Pat. Off. | C09D 11/00 |
| 930033350 | 2/1993 | Japan | C09D 11/00 |
| 660750A5 | 6/1987 | Switzerland | C09D 11/00 |
| 2031448 | 4/1980 | United Kingdom | C09D 11/10 |

*Primary Examiner*—Marion E. McCamish
*Assistant Examiner*—John J. Guarriello

[57] ABSTRACT

The substantial reduction of aerosol generation in ink-jet printing is achieved with the addition of a viscoelastic polymer to ink-jet ink compositions. The viscoelastic polymer component is employed at a concentration within the range of 5 to 10 ppm. Examples of suitably employed viscoelastic polymers are polyacrylamides having weight average molecular weights ranging from about 10,000 to 5,000,000 and polyvinylpyrrolidones having molecular weights ranging from about 3,000 to 1,000,000, as well as mixtures thereof. The addition of a viscoelastic polymer component serves to increase the extensional viscosity and the surface tension of the ink, thereby preventing or at least delaying the fragmentation of the tail of an ink droplet ejected by an ink-jet printer. Accordingly, any breakoff remnants are provided with sufficient mass and velocity such that trajectory control is not abandoned to aerodynamic forces.

14 Claims, 1 Drawing Sheet

POLYMERIC ADDITIVES FOR THE ELIMINATION OF INK JET AEROSOL GENERATION

TECHNICAL FIELD

The present invention relates to ink compositions employed in ink-jet printing and, more particularly, to the reduction of aerosol generation in ink-jet printing by including polymeric additives in ink-jet ink compositions.

BACKGROUND ART

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, resistive heating is used to vaporize the ink, which is expelled through an orifice in the ink-jet pen toward the print medium. Such printers are provided with a plurality of orifices, each orifice being associated with a resistor. A microprocessor selects the appropriate resistor for ink ejection and directs an electrical current to that resistor to achieve resistive heating and the consequential ejection of ink through the orifice associated with the selected resistor. The pattern of particular resistor/orifice pairs selected for ink ejection by the microprocessor determines the configuration of the alphanumeric character, area fills, or other pattern that is printed on the paper. In piezoelectric ink-jet printing, the ink droplets are ejected due to the vibrations of piezoelectric crystals, again, in response to electrical signals generated by a microprocessor.

Regardless of type of energy employed to eject ink from an ink-jet printer, a common problem experienced in ink-jet printing is the disintegration of an ejected droplet of ink such that certain portions of the original ink droplet do not reach the intended position on the print medium. More specifically, it is known that an ink droplet ejected by an ink-jet printer generally has a head portion and a tail portion. The tail portion is susceptible to fragmenting into smaller volumes of ink, termed herein as "breakoff remnants". Certain breakoff remnants do not thereafter deposit at the intended destination on the print medium along with the head portion and intact tail portion of the ejected ink droplet. Rather, certain breakoff remnants are small enough such that their trajectory is altered by aerodynamic drag. Breakoff remnants that do not reach their intended destination on the print medium due to aerodynamic drag are known collectively as "aerosol".

Not all breakoff remnants are encompassed by the term "aerosol". Rather, a breakoff remnant must be sufficiently small to be materially affected by aerodynamic drag, and the fragmentation of the tail creating the breakoff remnant must have occurred sufficiently far from the print medium destination to provide an opportunity for aerodynamic drag to alter its flight path. Theoretically, the size of the breakoff remnants and the time at which breakoff occurs are largely affected by the interaction between the inertial forces at work, the viscosity of the ink, and the surface tension of the ink.

The generation of aerosol in ink-jet printing is undesirable because control of the position of ejected ink on the print medium is effectively wrested from the printer microprocessor and diverted to random aerodynamic forces. Aerosol negatively affects print quality by diminishing the amount of ink directed to create a particular alphanumeric character, area fill, or other pattern. Moreover, the breakoff remnants making up aerosol may land on a portion of the print medium intended to remain blank, thereby adversely affecting print quality.

Accordingly, a need exists for a means to substantially reduce or eliminate the formation of aerosol in ink-jet printing. The means employed must not adversely affect print quality and must be easily implemented.

DISCLOSURE OF INVENTION

In accordance with the invention, an ink-jet ink composition and method for reducing aerosol formation in ink-jet printing are provided which employ a viscoelastic polymer. More specifically, the present ink-jet ink composition comprises at least one dye and an aqueous-based vehicle, with a substantial reduction in aerosol formation realized by the incorporation of at least one viscoelastic polymer selected from the group consisting of polyacrylamides, polyvinylpyrrolidones, and mixtures thereof, with the viscoelastic polymer being present in the ink-jet ink composition within the range of about 5 to 10 ppm.

The viscoelastic polymer component serves to increase the extensional viscosity as well as the surface tension of the ejected ink so that the tail portion is more apt to remain intact. Moreover, even if tail fragmentation nevertheless occurs, the viscoelastic polymer component actually serves to move the point of fragmentation farther from the head, thereby delaying fragmentation such that any breakoff remnants are closer to the print medium when formed. Finally, any ink that does break away from the tail in the practice of the invention likely forms satellite drops having sufficient size such that their trajectories are not dominated by aerodynamic forces. In other words, the incorporation of a viscoelastic polymer in an ink-jet ink composition battles the formation of aerosol in two ways: (1) it deters fragmentation; (2) in the event of fragmentation, it maximizes the size of the satellite droplets and delays their formation.

The ink composition and method of the invention may be used with a variety of ink-jet printers such as continuous, piezoelectric drop-on-demand printers and thermal or bubble jet drop-on-demand printers. The reduction of aerosol formation achieved in the practice of the invention improves the print quality achievable with ink-jet printers.

BEST MODES FOR CARRYING OUT THE INVENTION

Figure 1A:
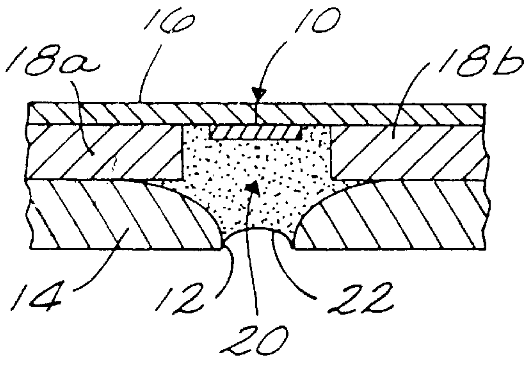
FIGS. 1A–1E are cross-sectional views of a firing chamber in a thermal ink-jet pen, depicting the time sequence of events of ink being fired and showing the development of a tail portion that may fragment into breakoff remnants collectively known as aerosol.
Figure 1B:
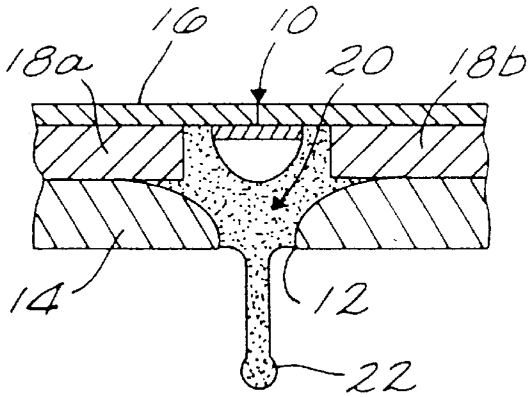

Aerosol formation is substantially reduced in the practice of the present invention by incorporating a viscoelastic polymer component into ink-jet ink compositions. The viscoelastic polymer component is employed in the present inks at a concentration ranging from about 5 to 10 ppm. Within this concentration range, the viscoelastic polymer serves to prevent or delay the formation of aerosol breakoff remnants. Inks formulated in accordance with the invention may be printed by an ink-jet printer onto various forms of print media, including paper, transparencies, and textiles. Moreover, the present inks may be suitably employed in any ink-jet printer; however, they are particularly useful in thermal ink-jet printers.

FIG. 1A through 1E depict the time sequence of what is believed to be happening to generate breakoff remnants that collectively form aerosol when thermal ink-jet printing. The Figures depict a side elevational view of one firing resistor 10 and associated orifice 12 in a orifice plate 14. The resistor 10 is supported on a substrate 16. A barrier layer 18 defines the firing chamber 20 in which the resistor 10 resides, and is seen to the left and right of the resistor, forming two walls 18*a* and 18*b*. A further barrier wall (not shown) is "above" the plate of the Figure; the three barrier walls 18*a*, 18*b*, and the further barrier wall define three sides of the firing chamber 20, leaving a fourth wall open. Ink 22 enters the firing chamber 20 from an ink feed slot (not shown), which is in slot form and supplies ink to a plurality of resistors on either side (one side is the "even" side, and the other side is the "odd" side) from a reservoir (not shown) beneath the substrate 16. The ink feed slot fluidically communicates with the firing chamber 20 by means of a barrier inlet channel (not shown). The barrier inlet channel connects with the firing chamber 20 through the pen wall and thus is "below" the plane of the Figure.

Figure 1C:
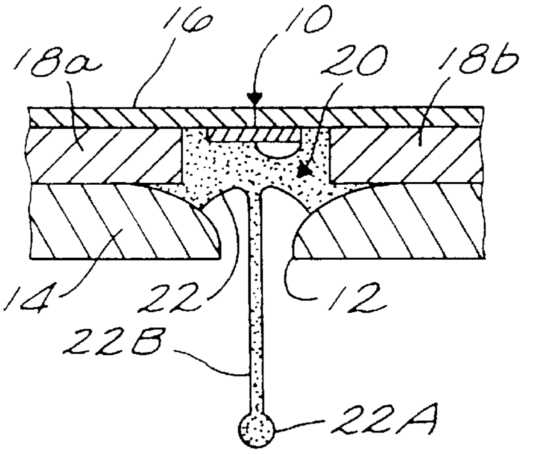
Figure 1D:
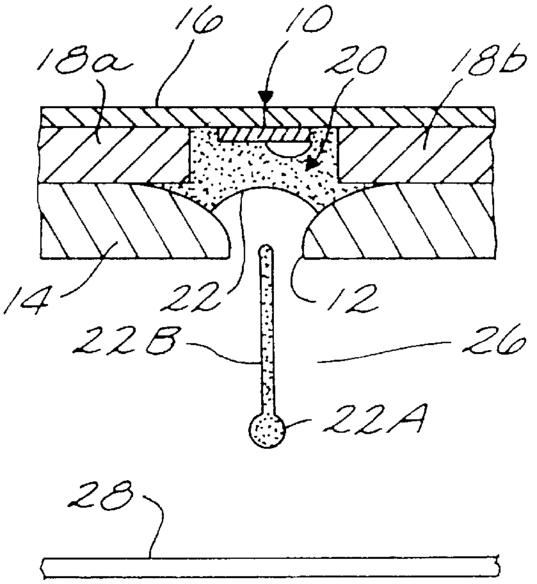
Figure 1E:
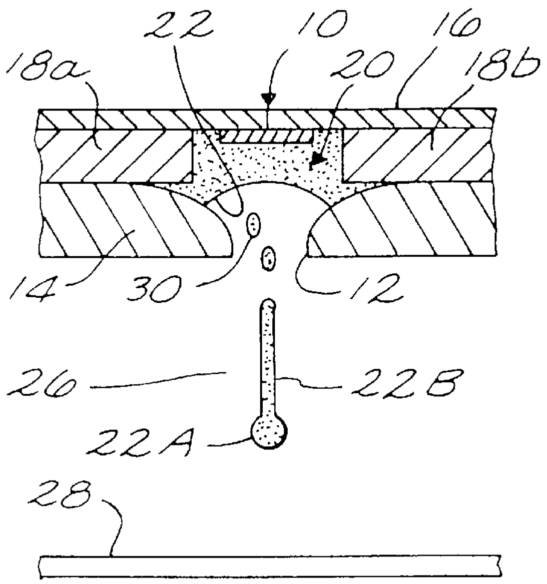

FIG. 1A depicts ink in the equilibrium state. As the drop is ejected (FIG. 1B), the meniscus of the ink 22 retracts into the firing chamber 20 to make up for the ink that is forming the head 22*a* and tail 22*b* (FIG. 1C). FIG. 1D depicts the detachment of the tail 22*b* from the meniscus of the ink 22 and the movement of the head/tail assembly 26 of the ejected ink toward its destination on the print medium 28. FIG. 1E depicts the fragmentation of the tail 22*b* of the ejected ink assembly 26, forming breakoff remnants 30. If the breakoff remnants 30 are sufficiently small and are generated long enough before the parent head/tail assembly 26 strikes the print medium 28, the trajectories of the breakoff remnants 30 are controlled by aerodynamic forces and are termed aerosol.

By including a viscoelastic polymer component in ink-jet ink compositions in accordance with the invention, one prevents the formation of aerosol breakoff remnants by increasing the extensional viscosity and surface tension of the ink so that the tail portion is more apt to remain intact. Moreover, even if tail fragmentation nevertheless occurs, the viscoelastic polymer component actually serves to move the point of fragmentation farther from the head, thereby delaying any fragmentation until the ejected ink is closer to the print medium. Finally, the incorporation of a viscoelastic polymer agglomerates the breakaway remnants from the tail into larger satellite drops such that that their trajectories are less likely to be dominated by aerodynamic forces. In sum, the incorporation of a viscoelastic polymer component in an ink-jet ink composition battles the formation of aerosol in basic two ways: (1) by deterring fragmentation; and (2) in the event of fragmentation, by maximizing the size of fragmented particles and delaying their formation.

To effectively decrease the formation of aerosol, the viscoelastic polymer component is employed within the range of about 5 to 10 ppm. It has been determined experimentally that an ink-jet ink composition employing only 2 ppm of a polyacrylamide is not benefited by reduced aerosol formation. On the other hand, ink-jet ink compositions employing more than 10 ppm of a polyacrylamide exhibit pseudo-plastic effects (i.e., "rubberbanding") that are counterproductive to ink-jet printing. Moreover, precipitation might occur at concentrations higher than about 10 ppm. Preferably, the viscoelastic polymer is employed at about 10 ppm.

Viscoelastic polymers suitably employed in the practice of the invention may be any such polymer that increases the extensional viscosity without affecting the sheer viscosity of the ink-jet ink. Examples of classes of suitably employed viscoelastic polymers include, but are not limited to, polyacrylamides and polyvinylpyrrolidones. A mixture of viscoelastic polymers may be employed in the practice of the invention. Thus, a mixture of a polyacrylamide and a polyvinylpyrrolidone may be successfully employed, as well as a mixture of polyacrylamides having different molecular weights. Preferably, the viscoelastic polymer component comprises a mixture of 50 wt % polyacrylamide and 50 wt % polyvinylpyrrolidone or, alternatively, solely comprises a polyacrylamide.

Polyacrylamides suitably employed in the practice of the invention should have a molecular weight within the range of about 10,000 and 5,000,000, while polyvinylpyrrolidones so employed should have a molecular weight within the range of about 3,000 and 1,000,000. Preferably, the polyacrylamides and polyvinylpyrrolidones employed have molecular weights of approximately 10,000 and 30,000, respectively.

The viscoelastic polymers of the invention may include functional groups such as acetals, ketals, aliphatic aldehydes, aromatic aldehydes, alicyclic aldehydes, heterocyclic aldehydes, amines, amine salts, amino acids, peptides, anilines, heterocyclic amines, azo, azoxy, and diazonium derivatives, carboxylic acids and their derivatives, including esters, lactones, purines, pyrimidines, amides, cyanates, isocyanates, isothiocyanates, thiocyanates, deuterated compounds, ethers, hydrazines, hydrazones, osazones, hydrocarbons, hydroxy-containing compounds, imines, ketones, nitriles, organo-metallic derivatives, sulfur-containing compounds, tyrosines, ureas, thioureas, and quaternary amines. Of the foregoing functional groups, the amine salts, amino acids, peptides, diazonium derivatives, organo-metallic derivatives and quaternary amines contain charged units.

The dye component employed in the present ink-jet ink compositions may be any of the water-soluble dyes used in inks for ink-jet printers. Examples of suitable dyes include, but are not limited to, Food Black 2, Carta Black, Direct Black 19, Direct Black 51, Direct Black 109, Direct Black 154, Direct Blue 86, Direct Blue 199, Direct Red 9, Direct Red 32, Acid Yellow 23, Acid Blue 185, Acid Blue 9, Acid Red 17, Acid Red 52, Acid Red 249, and Reactive Red 180. The concentration of the dye preferably ranges from about 0.1 to 7 wt %. Less than about 0.1 wt % results in an ink of unacceptable lightness, while greater than about 7 wt % results in clogging of the orifices in the ink-jet pen. More preferably, the dye is present within the range of about 0.1 to 4 wt % of the ink-jet ink composition. A mixture of dyes may also be employed.

While it is contemplated that the incorporation of polymeric additives will be largely employed to reduce aerosol associated with dye-based ink-jet ink compositions, it is acknowledged that pigment-based inks could also benefit from the practice of the invention.

Preferably, the vehicle of the present ink-jet ink composition comprises, in addition to the viscoelastic polymer component, at least one diol, at least one glycol ether, 2-pyrrolidone, at least one inorganic salt, and the balance water. More specifically, the vehicle of the present ink-jet ink compositions preferably comprises the following concentrations, expressed as percentage of total ink composition: (a) about 3 to 20 wt % of at least one diol; (b) up to about 5 wt % of at least one glycol ether; (c) about 3 to 9 wt % of 2-pyrrolidone; (d) about 0.5 to 5 wt % of at least one component selected from the group consisting of surfactants, buffers, and biocides; (e) about 3 to 11 wt % of at least one inorganic salt; (f) about 5 to 10 ppm of at least one viscoelastic polymer; and (g) the balance water. While the above-described vehicle formulation is preferred, any aqueous-based vehicle suitable for ink-jet ink compositions may be benefited in the practice of the invention.

Examples of diols that may be employed in the preferred ink vehicle include any of, or a mixture of two or more of, such compounds as ethanediols (e.g., 1,2-ethanediol); propanediols (e.g., 1,2-propanediol, 1,3-propanediol, 2-ethyl-2-hydroxymethyl-1,3-propanediol, ethylhydroxypropanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). Preferably 1,5-pentanediol and EHPD are employed in the ink vehicle.

The glycol ether component of the ink vehicle may comprise any of the glycol ethers and thioglycols ethers, and mixtures thereof, commonly employed in ink-jet ink compositions. Examples of such compounds include polyalkylene glycols such as polyethylene glycols (e.g., diethylene glycol, triethylene glycol, tetraethylene glycol, etc.) polypropylene glycols (e.g., dipropylene glycol, tripropylene glycol, tetrapropylene glycol, etc.); polymeric glycols (e.g., PEG 200, PEG 300, PEG 400, PPG 400, etc.) and thioglycol. Preferably diethylene glycol is employed in the ink vehicle.

The inorganic salt component preferably employed in the ink vehicle serves to prevent bleed between black ink and color inks, and comprises one or more inorganic salts. The inclusion of an inorganic salt component to control bleed is disclosed in U.S. Pat. No. 5,198,023 (entitled "Cationic Dyes with Added Multi-Valent Cations to Reduce Bleed in Thermal Ink-Jet Inks and assigned to the same assignee as the present application). The salts, must, of course, be soluble in the ink in the concentration employed. Suitably employed cations for the inorganic salt include alkaline earth metals of group 2A of the periodic table (e.g., magnesium and calcium); the transition metals of group 3B of the periodic table (e.g., lanthanum); cations from group 3A of the periodic table (e.g., aluminum); and lanthanides (e.g., neodymium). Preferably, calcium and magnesium are employed as cations. Suitably-employed anions associated with calcium include nitrate, chloride, acetate, benzoate, formate, and thiocyanate, while suitable anions associated with magnesium include nitrate, chloride, acetate, benzoate, bromide, citrate, formate, iodide, sulfate, fluoride, tartrate, and thiocyanate. Inorganic salts most preferably employed in the present ink vehicle are the nitrate, chloride, and acetate salts of calcium and magnesium.

Other components that may be employed in the present ink vehicle include surfactants, buffers, biocides, and the like, each of which are commonly employed additives in ink-jet printing.

Surfactants are commonly employed to prevent color to color bleed by increasing the penetration of the inks into the print medium. Any surfactants suitably employed for this purpose in ink-jet ink compositions may be included in the present ink vehicle. Examples of classes of surfactants that might be employed include anionic and nonionic surfactants.

Buffers employed in the present ink vehicle to modulate pH should be organic-based biological buffers, since inorganic buffers would likely precipitate in the presence of the relatively large amount of inorganic salts in the ink composition. Further, the buffer employed should provide a pH ranging from about 6 to 9 for best results. Examples of preferably-employed buffers include Trizma Base, which is available from, for example, Aldrich Chemical (Milwaukee, Wis.), and 4-morpholine ethane sulfonic acid (MES).

Consistent with the requirements for this invention, various other types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Additionally, sequestering agents such as EDTA may be included to eliminate deleterious effects of heavy metal impurities. Finally, ammonium nitrate may be included in the ink vehicle to prevent the precipitation of any calcium-containing inorganic salts in the ink which may occur upon exposure of the ink to carbon dioxide in the atmosphere.

The purity of all components is that found in common commercial practice.

Inks formulated with a viscoelastic polymer component in accordance with the present invention exhibit a substantially reduced quantity of aerosol generation without an associated decline in ink-jet print quality. These attributes are demonstrated in the following examples.

EXAMPLES

To demonstrate the reduction in aerosol achieved in the practice of the invention, four aqueous-based inks were formulated having the following compositions:

TABLE 1

Example Ink Formulations.
All values are in ppm (w/w).

| Component | Ink A | Ink B | Ink C | Ink D |
|---|---|---|---|---|
| DB-TMA dye[1] | 1200 | 1200 | 1200 | 1200 |
| AB9-Na dye[2] | 2,100 | 2,100 | 2,100 | 2,100 |
| 1,5-pentanediol | 80,000 | 80,000 | 80,000 | 80,000 |
| EHPD | 75,000 | 75,000 | 75,000 | 75,000 |
| 2-pyrrolidone | 75,000 | 75,000 | 75,000 | 75,000 |
| surfactant | 22,500 | 22,500 | 22,500 | 22,500 |
| magnesium nitrate[3] | 60,000 | 60,000 | 60,000 | 60,000 |
| Proxel Gel | 2,000 | 2,000 | 2,000 | 2,000 |
| Trizma Base | 2,000 | 2,000 | 2,000 | 2,000 |
| Viscoelastic Polymer | | | | |
| PAA[4]: | 10 | 5 | 0 | 0 |
| PVP[5]: | 0 | 5 | 10 | 0 |

[1]Direct Blue-type dye associated with tetramethyammonium.
[2]Acid Blue 9 dye associated with sodium.

These inks were each separately loaded into the pen of a DeskJet® ink-jet printer, available from Hewlett Packard. The inks were then separately printed onto a paper medium. A laser particle counter was used to measure the distribution of radius size of the ink in terms of particle counts, thereby quantifying the amount of aerosol associated with each ink.

Ink D, which did not contain a viscoelastic polymer, had the highest particle count (1,646,630 particles/$m^3$). Inks A, B, and C each showed a reduction in aerosol from that of Ink D. Ink A exhibited a particle count of 675,233 particles/$m^3$; Ink B exhibited a particle count of 698,200 particles/$m^3$; and Ink C exhibited a particle count of 894,320 particles/$m^3$.

Therefore, the inks formulated in accordance with the invention demonstrated a substantial reduction of aerosol formation when compared to an ink containing no viscoelastic polymer component.

Thus, it has been demonstrated that aerosol formation is substantially reduced in the practice of the invention.

INDUSTRIAL APPLICABILITY

The present ink-jet ink compositions and method for substantially reducing aerosol formation in ink-jet printing as disclosed herein are expected to find commercial use in ink-jet printing.

Thus, there has been disclosed an ink-jet ink composition exhibiting reduced aerosol generation as well as a method of reducing aerosol generation in ink-jet printing. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An ink-jet ink composition comprising at least one dye and a vehicle including water, said ink-jet ink composition exhibiting a reduction in aerosol formation during printing by further comprising at least one polymer selected from the group consisting of polyacrylamides, polyvinylpyrrolidones, and mixtures thereof and present in said ink-jet ink composition within the range of about 5 to 10 ppm.

2. The ink-jet ink composition of claim 1 wherein said polyacrylamides have a weight average molecular weight within the range of about 10,000 to 5,000,000 and said polyvinylpyrrolidones have a weight average molecular weight within the range of about 3,000 to 1,000,000.

3. The ink-jet ink composition of claim 2 wherein said polyacrylamides have a weight average molecular weight of about 10,000 and said polyvinylpyrrolidones have a weight average molecular weight of about 30,000.

4. The ink-jet ink composition of claim 1 wherein said at least one polymer comprises 50 wt % of a polyacrylamide having a weight average molecular weight of about 10,000 and 50 wt % of a polyvinylpyrrolidone having a weight average molecular weight of about 30,000.

5. The ink-jet ink composition of claim 1 wherein said at least one polymer comprises a polyacrylamide having a weight average molecular weight of about 10,000.

6. The ink-jet ink composition of claim 1 wherein said at least one dye is selected from the group consisting of Food Black 2, Carta Black, Direct Black 19, Direct Black 51, Direct Black 109, Direct Black 154, Direct Blue 86, Direct Blue 199, Direct Red 9, Direct Red 32, Acid Yellow 23, Acid Blue 185, Acid Blue 9, Acid Red 17, Acid Red 52, Acid Red 249, and Reactive Red 180.

7. The ink-jet ink composition of claim 1 wherein said ink-jet ink composition comprises:

(a) about 0.1 to 4 wt % of at least one dye;

(b) about 3 to 20 wt % of at least one diol;

(c) up to about 5 wt % of at least one glycol ether;

(d) about 3 to 9 wt % of 2-pyrrolidone;

(e) about 0.5 to 5 wt % of at least one component selected from the group consisting of surfactants, buffers, and biocides;

(f) about 3 to 11 wt % of at least one inorganic salt;

(g) about 5 to 10 ppm of at least one polymer; and (h) the balance water.

8. A method of reducing aerosol in ink-jet printing comprising:

(a) formulating an ink-jet ink composition to comprise:

(i) at least one dye, and (ii) a vehicle including water and at least one polymer selected from the group consisting of polyacrylamides, polyvinylpyrrolidones, and mixtures thereof and present in said ink-jet ink composition within the range of about 5 to 10 ppm; and (b) printing said ink-jet ink composition on a print medium by means of an ink-jet pen, whereupon aerosol formulation by said ink-jet ink composition is reduced.

9. The method of claim 8 wherein said polyacrylamides have a weight average molecular weight within the range of about 10,000 to 5,000,000 and said polyvinylpyrrolidones have a weight average molecular weight with in the range of about 3,000 to 1,000,000.

10. The method of claim 9 wherein said polyacrylamides have a weight average molecular weight of about 10,000 and said polyvinylpyrrolidones have a weight average molecular weight of about 30,000.

11. The method of claim 8 wherein said at least one polymer comprises 50 wt % of a polyacrylamides having a weight average molecular weight of about 10,000 and 50 wt % of a polyvinylpyrrolidones having a weight average molecular weight of about 30,000.

12. The method of claim 8 wherein said at least one polymer comprises a polyacrylamide having a weight average molecular weight of about 10,000.

13. The method of claim 8 wherein said at least one dye is selected from the group consisting of Food Black 2, Carta Black, Direct Black 19, Direct Black 51, Direct Black 109, Direct Black 154, Direct Blue 86, Direct Blue 199, Direct Red 9, Direct Red 32, Acid Yellow 23, Acid Blue 185, Acid Blue 9, Acid Red 17, Acid Red 52, Acid Red 249, and Reactive Red 180.

14. The method of claim 8 wherein said ink-jet ink composition comprises:

(a) about 0.1 to 4 wt % of at least one dye;

(b) about 3 to 20 wt % of at least one diol;

(c) up to about 5 wt % of at least one glycol ether;

(d) about 3 to 9 wt % of 2-pyrrolidone;

(e) about 0.5 to 5 wt % of at least one component selected from the group consisting of surfactants, buffers, and biocides;

(f) about 3 to 11 wt % of at least one inorganic salt;

(g) about 5 to 10 ppm of at least one polymer; and (h) the balance water.

* * * * *

UNITED STATES PATENT AND TRADEMARK OFFICE
CERTIFICATE OF CORRECTION

PATENT NO. : 5,814,683
DATED : September 29, 1998
INVENTOR(S) : Branham

It is certified that error appears in the above-identified patent and that said Letters Patent is hereby corrected as shown below:

<u>Column 4,</u>
Line 13, delete "molecular" and insert therefor -- weight average molecular weights --.
Line 14, delete "weights".
Lines 19 and 21, delete "molecular weight" and insert therefor -- weight average molecular weight --.

<u>Column 6,</u>
After line 61, insert the following:

-- [3]Magnesium nitrate hex hydrate.

[4]polyacrylamide having a weight average molecular weight of about 10,000.

[5]polyvinylpyrrolidone having a weight average molecular weight of about 30,000. --

Signed and Sealed this

Twenty-third Day of December, 2003

JAMES E. ROGAN
*Director of the United States Patent and Trademark Office*